United States Patent
Ikegami (10) Patent No.: US 6,227,564 B1
(45) Date of Patent: May 8, 2001

(54) PASSENGER PROTECTING APPARATUS FOR VEHICLE

(75) Inventor: Kenji Ikegami, Kanagawa-ken (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/343,091

(22) Filed: Jun. 30, 1999

(30) Foreign Application Priority Data

Jul. 2, 1998 (JP) .................................................. 10-187798

(51) Int. Cl.[7] .................................................. B60R 21/32
(52) U.S. Cl. .................................................. 280/735; 701/45
(58) Field of Search .................................. 180/282; 280/735; 701/45

(56) References Cited

U.S. PATENT DOCUMENTS

| | | | |
|---|---|---|---|
| 4,243,248 | * 1/1981 | Scholz et al. | 280/735 |
| 5,390,951 | * 2/1995 | Iyoda | 280/735 |
| 5,673,932 | * 10/1997 | Nitschke et al. | 280/735 |
| 5,702,123 | * 12/1997 | Takahashi et al. | 280/735 |
| 5,787,377 | * 7/1998 | Watanabe et al. | 701/45 |
| 5,860,674 | * 1/1999 | Corrado | 280/735 |
| 5,868,423 | * 2/1999 | Takimoto et al. | 280/735 |
| 5,871,232 | * 2/1999 | White | 280/735 |
| 5,935,182 | * 8/1999 | Foo et al. | 701/45 |
| 5,967,548 | * 10/1999 | Kozyreff | 280/735 |
| 5,997,033 | * 12/1999 | Gray et al. | 280/735 |
| 6,018,693 | * 1/2000 | Blackburn et al. | 701/45 |
| 6,113,137 | * 9/2000 | Mizutani et al. | 280/735 |

* cited by examiner

Primary Examiner—Lanna Mai
Assistant Examiner—Ruth Ilan
(74) Attorney, Agent, or Firm—McDermott, Will & Emery (57) ABSTRACT

A passenger protecting apparatus is provided for protecting a passenger on a front passenger's seat at a vehicle's collision. In the apparatus, it is carried out to appropriately select an inflating mode of an air bag on rapid estimation of the passenger's position at the start of inflating the air bag. When a pre-crush brake G sensor 12 detects a driver's pre-crush braking operation, it is executed to pick up a passenger's sitting position that a passenger's position detecting device 3 has been detecting and estimate the passenger's position at the start of inflating the air bag on the basis of the passenger's sitting position and a passenger's displacement. The passenger's displacement is obtained by double time integrating an acceleration detected by a collision detecting sensor 11 with respect to a degree of impact due to the vehicle's collision. When the estimated passenger's position is out of a designated zone defined by a predetermined distance from a deployment door, then a normal mode is selected to inflate the air bag at a normal speed. While, if the estimated position is within the designated zone, the air bag is unfolded at a moderate inflating mode.

8 Claims, 6 Drawing Sheets

PASSENGER PROTECTING APPARATUS FOR VEHICLE

BACKGROUND OF THE INVENTION

1. Field of the Invention

The present invention relates to a passenger protecting apparatus for a vehicle.

2. Description of the Related Art

When a driver applies the pre-crush brake, which is defined as a rapid braking to avoid a car collision, then if the passenger on the passenger seat of the vehicle is not wearing a seat belt he will tumble forward in an unrestrained manner. If a passenger side air bag is unfolded immediately after the pre-crush braking operation, there is the possibility of injury, since the upper body of the passenger will be located in the vicinity of the deployment door for the air bag.

From this point of view, there is proposed a passenger protecting apparatus which is adapted so as to inflate the air bag at a more moderate speed (referred to "TAILORED" mode) than a normal speed (NORMAL mode) under a situation that the passenger exists in the vicinity of the deployment door at the time of vehicle's collision.

In the above apparatus, it is necessary to detect a position of the passenger at the vehicle's collision in order to select the inflating speed of the air bag in either NORMAL mode or TAILORED mode in accordance with the passenger's position just before inflating the air bag. Under a situation, there have been a variety of proposals as means for detecting the seating position of the passenger and the condition of the seat, hitherto.

SUMMARY OF THE INVENTION

It is therefore an object of the present invention to provide a passenger protecting apparatus which does not require means for detecting the passenger's position just before inflating the air bag at the vehicle's collision to have high speed of response but the conventional response time for judging whether or not the air bag should be inflated and which is capable of appropriately selecting the inflating speed so as to cope with the instant tumbling forward of the passenger.

According to the present invention, the above-mentioned object of the present invention can be accomplished by a passenger protecting apparatus for a vehicle, comprising:

an air bag capable of inflating in either first inflating mode where the air bag is inflated under first pressure or second inflating mode where the air bag is inflated under second pressure, the second pressure being established to be smaller than the first pressure;

a collision impact detecting unit for detecting a degree of impact produced at the vehicle's collision;

an abrupt brake detecting unit for detecting an abrupt brake of the vehicle;

a sitting position detecting unit for detecting the sitting position of a passenger and holding the detected sitting position;

a passenger's position estimating unit for picking up the sitting position of the passenger being detected and held by the sitting position detecting unit when the abrupt brake detecting unit detects the abrupt brake, thereby to estimate the position of the passenger at the air bag's inflating on the basis of the sitting position and the degree of impact detected by the collision impact detecting unit; and an air bag inflation control unit for controlling the inflation of the air bag on the basis of judgment of either the first inflating mode or the second inflating mode.

In the passenger protecting apparatus, when the degree of impact exceeds a predetermined value and the passenger's position estimated by the passenger's position estimating unit is out of a designated zone defined by a predetermined distance from a deployment door, the air bag inflation control unit determines to inflate the air bag in the first inflating mode. On the other hand, when the passenger's position estimated by the passenger's position estimating unit is within the designated zone, the air bag inflation control unit determines to inflate the air bag in the second inflating mode.

The above and other features and advantages of this invention will become apparent, and the invention itself will best be understood, from a study of the following description and appended claims, with reference to the attached drawings showing some preferred embodiments of the invention.

DESCRIPTION OF THE PREFERRED EMBODIMENT

Figure 1:
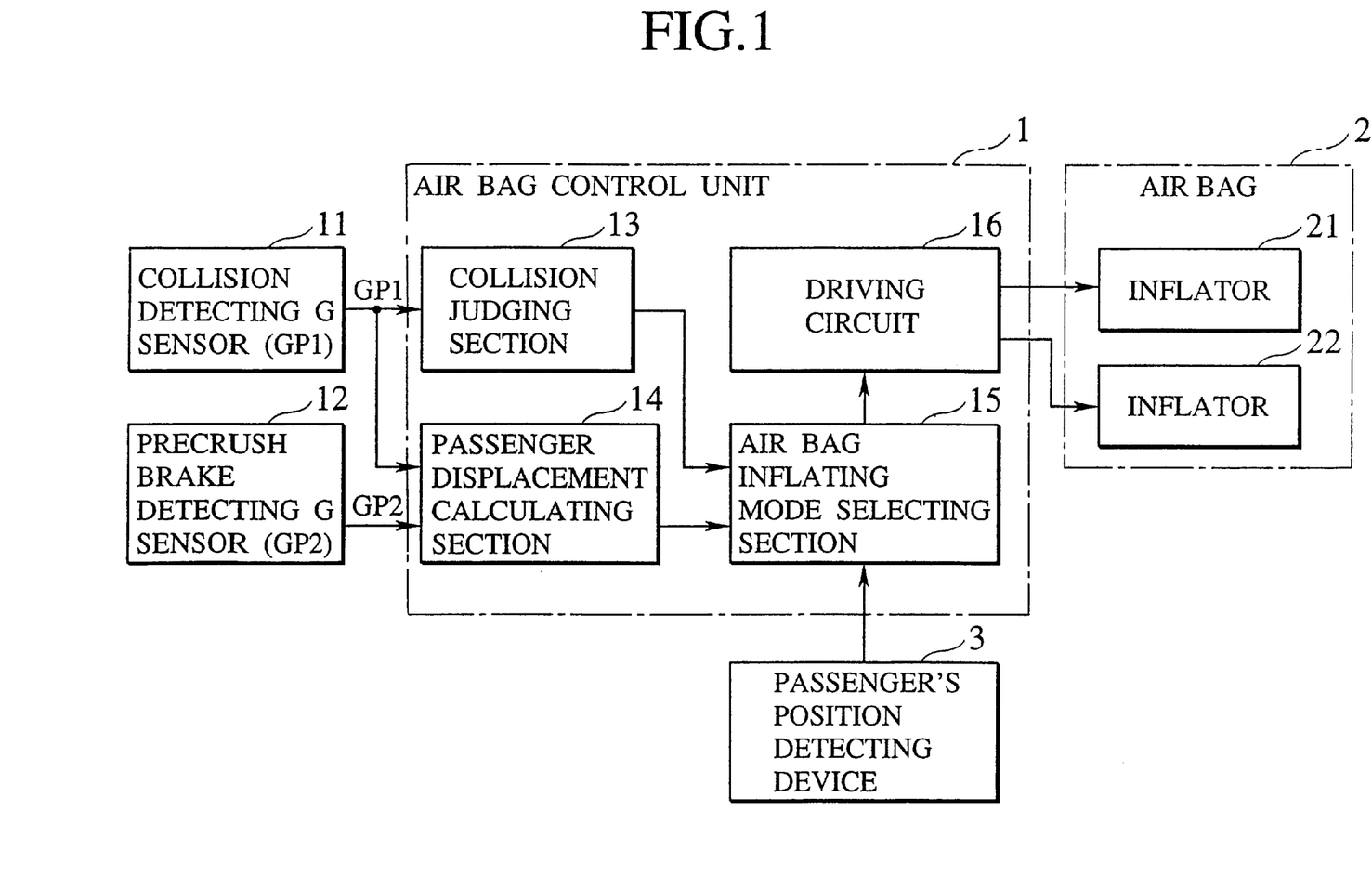
FIG. 1 is a block diagram showing the constitution of a passenger protecting apparatus in accordance with a first embodiment of the present invention.

Referring to the attached drawings, we now describe embodiments of the present invention. FIG. 1 shows the constitution of a passenger protecting apparatus of the first embodiment. The passenger protecting apparatus of the embodiment is provided for controlling the inflation of an air bag for a front passenger's seat and comprises an air bag control unit 1, an air bag 2 to be inflated on selection of either one of the first inflating mode (normal mode) at a first speed or the second inflating mode (tailored mode) at a second speed and a passenger's position detecting device 3 for monitoring the position of the passenger sitting on the front passenger's seat continuously.

The air bag control unit 1 includes a collision detecting G sensor (GP1) 11 for detecting negative acceleration produced at the vehicle's collision, a pre-crush detecting G sensor (GP2) 12 which is more sensitive than the sensor 11 to detect negative acceleration having an absolute value smaller than that of the former negative acceleration, and a collision judging section 13 for judging whether there is caused a collision requiring to inflate the air bag on the basis of the acceleration detected by the collision detecting G sensor 11.

The air bag control unit 1 further includes a passenger displacement calculating section 14 which begins to calculate a displacement (moving distance) of the passenger when the acceleration detected by the G sensor 12 exceeds a predetermined value and calculates the passenger's displacement by double-integrating the acceleration that the collision detecting G sensor 11 outputs, an air bag inflating mode selecting section 15 for determining whether the inflation of the air bag is carried out in the first mode or in the second mode and a driving circuit 16 for inflating the air bag 2 in accordance with the inflating mode determined by the air bag inflating mode selecting section 15. Regarding the operation of the air bag inflating mode selecting section 15, when the collision judging section 13 does output the judgment of inflating the air bag, the section 15 firstly estimates the passenger's position at the beginning of inflating the air bag, on the basis of the passenger's seating position just before the judgment, which is detected by the passenger's position detecting device 3, and the passenger's displacement calculated by the passenger displacement calculating section 14. Successively, the air bag inflating mode selecting section 15 further judges whether the so-estimated passenger's position is within a predetermined range from the deployment door, whereby it is determined whether the inflation of the air bag should be carried out in the first mode or in the second mode.

The air bag 2 includes two inflators 21, 22. That is, in the first mode (i.e. normal mode), both of the inflators 21, 22 are simultaneously activated to inflate the air bag 2 at a normal speed. On the other hand, in the second mode (i.e. tailored mode), both of the inflators 21, 22 are activated in order by a designated time lag, so that the air bag 2 is inflated at a moderate speed.

Figure 2:
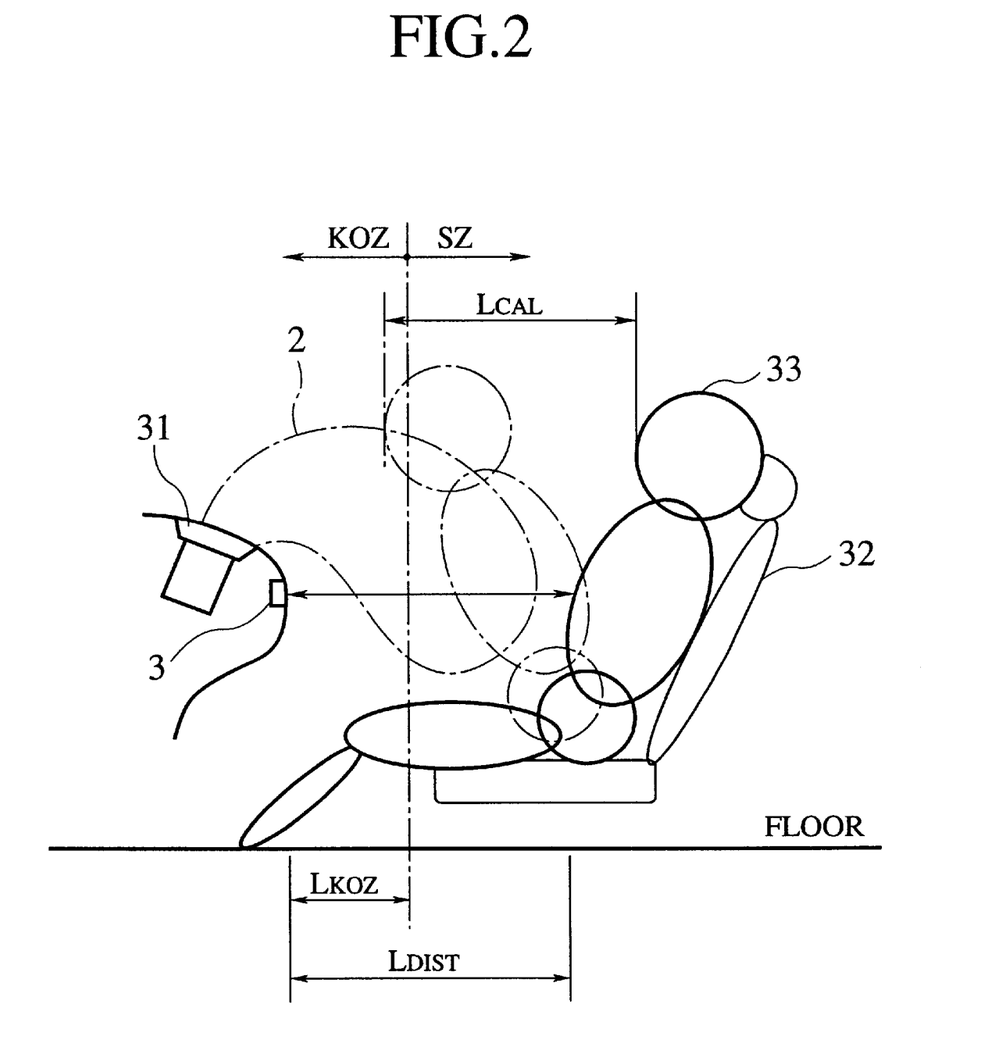
FIG. 2 is an explanatory diagram showing the constitution of a passenger position detecting device of the first embodiment.

Being arranged so as to oppose the front passenger's seat in the vicinity of a deployment door 31 for the passenger's air bag 2 as shown in FIG. 2, the passenger's position detecting device 3 measures a distance between the device 3 and a passenger 33 sitting on a front passenger's seat 32. As the passenger's position detecting device 3, there is adopted a range finder which is equipped with a pair of emitter and receptor for light, ultrasonic waves, or infrared light and estimates a distance $L_{DIST}$ by a period from the emission by the emitter till the acceptance by the receptor through the reflection on the assistant passenger 33.

The above-constructed passenger protecting apparatus of the first embodiment operates as follows. The collision detecting G sensor 11 is constituted by an electronic G sensor which converts the deceleration (negative acceleration) produced at the vehicle's collision in the front into an electrical signal and sequentially outputs it to both of the collision judging section 13 and the passenger displacement calculating section 14, as the signal GP1 expressing the value of impact energy (degree of impact).

The pre-crush brake detecting G sensor 12 is provided for detecting the occurrence of deceleration rate less than 1G. That is, being provided with a high sensitivity in comparison with the collision detecting G sensor 11, the pre-crush brake detecting G sensor 12 does detect the deceleration produced by the driver's operation of pre-crush braking and outputs the detected one to the passenger displacement calculating section 14.

Whenever the vehicle is traveling, the passenger's position detecting device 3 repeatedly measures the distance $L_{DIST}$ between the deployment door and the passenger, which is representative of the position of the passenger on the front passenger's seat.

When the front side of the vehicle collides, then the collision detecting G sensor 11 generates the acceleration signal GP1 expressing the degree of impact. Note, just before this collision, the driver usually steps on the abrupt brake, in other words, the pre-crush brake, in order to avoid the vehicle's collision. The pre-crush brake detecting G sensor detects the deceleration caused by the pre-crush brake, which is smaller than the impact by the vehicle's collision, and outputs the acceleration detecting signal GP2.

Then, by the passenger displacement calculating section 14, it is carried out to compare the acceleration signal GP2 from the sensor 12 with a threshold value TH. Thus, when it is judged that the signal GP2 corresponding to the pre-crush brake is being inputted to the section 14, then it is executed as the trigger to start the calculation to start the double time integration of the acceleration signal GP1 being outputted by the collision detecting G sensor 11. This double time integration $L_{CAL}$ is carried out for a period dt required for the collision judging section 13 to judge the inflating of air bag.

$$L_{CAL} = \int GP1 \cdot d^2 t$$

While monitoring the acceleration signal GP1 from the collision detecting sensor 11, the collision judging section 13 does judge the necessity of inflation when the signal GP1 exhibits an acceleration change corresponding to the degree of impact requiring the inflation, so that the command to unfold the air bag is outputted to the air bag inflating mode selecting section 15 by the section 13.

On the receipt of the command to unfold the air bag, the air bag inflating mode selecting section 15 picks up the distance $L_{DIST}$ representing the passenger's position before the collision from the passenger's position detecting device 3 and inputs the calculation value $L_{CAL}$ from the passenger displacement calculating section 14 thereby to judge whether or not the position of the passenger 33 at the start of inflation exists in a zone KOZ (see FIG. 2). That is, in the section 15, the following judgments are carried out to output the inflating mode and command to the drive circuit 16.

$L_{DIST} - L_{CAL} \leq L_{KOZ}$, →2nd. mode (TAILORED Mode)

$L_{DIST} - L_{CAL} > L_{KOZ}$, →1st. mode (NORMAL Mode)

Note, "KOZ" of FIG. 2 is an abbreviation for Keep Out Zone and designates a zone where the air bag is to be inflated in the second mode (TAILORED Mode), while "SZ" is an abbreviation for Safe Zone and designates a zone where the air bag is to be inflated in the first mode (NORMAL Mode).

Accepting the selecting command of the inflation mode, the drive circuit 16 simultaneously operates the inflators 21, 22 to unfold the air bag 2 at the normal speed in case of the command of the first mode. On the contrary, in case of the command of the second mode, the drive circuit 16 operates to shift the ignition timing for the inflators 21, 22 from each other thereby to ignite them in different phase. Consequently, the air bag is so inflated at a moderate speed that the passenger 33, who is approaching the deployment door 31 while falling forward, can be avoided from suffering a great impact due to the abrupt inflation of the air bag 2 and also protected from suffering the collision impact.

With reference to flow charts of FIGS. 3 and 4, the above-mentioned inflation control will be described in detail.

[Routine for calculating the passenger's displacement after detecting pre-crush brake]

Figure 3:
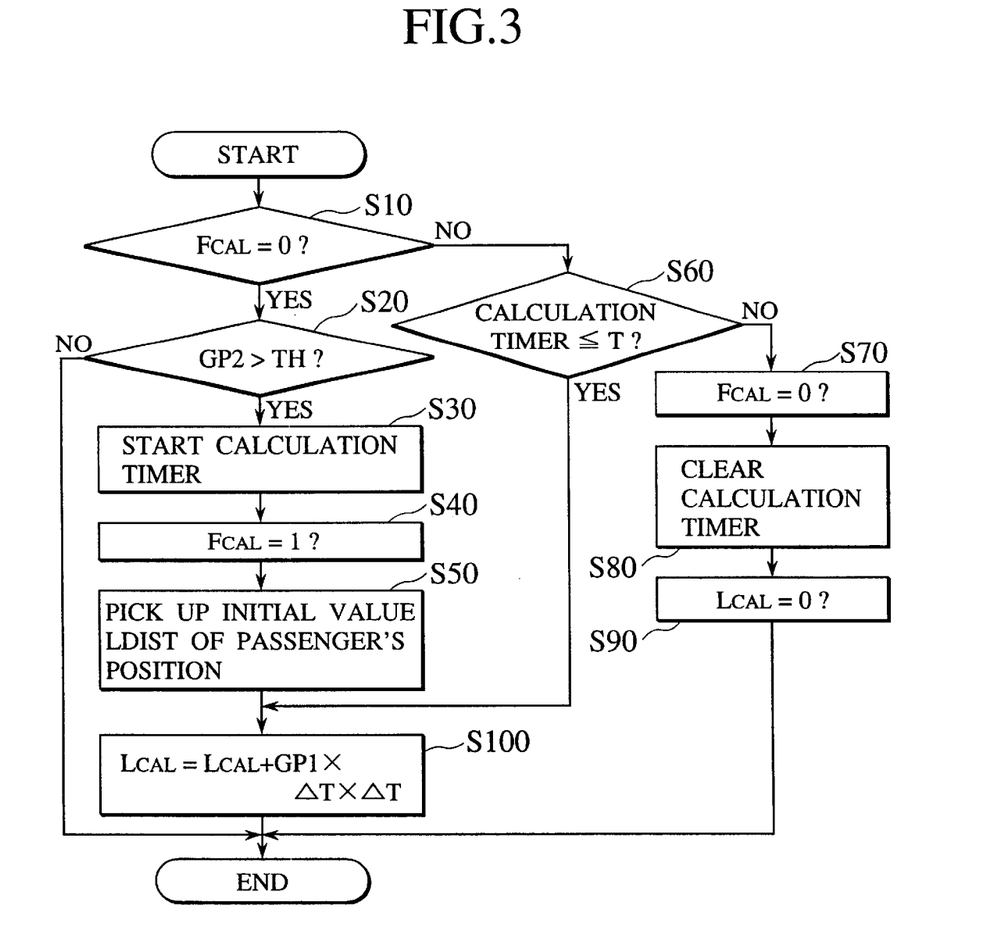
FIG. 3 is a flow chart showing a routine to calculate the passenger's displacement after detecting the pre-crush brake in the first embodiment.

In this routine of FIG. 3, "$F_{CAL}$" denotes a flag exhibiting the presence of the detection of pre-crush brake. At step S10, it is judged whether the flag $F_{CAL}$ is reset in zero (0). If the judgment at step S10 is Yes (0), then the routine goes to step S20 for judging the presence of pre-crush brake. On the other hand, if the flag $F_{CAL}$ has been set (1), then the routine goes to step S60 in order to avoid the initializing since the judgment at step S10 means that the calculation for passenger's displacement has been already started due to the previous detection of pre-crush brake. In this routine, it should be noted that the initial value of flag $F_{CAL}$ is established to zero(0).

At step S20, the presence (Yes or No) of detecting the pre-crush brake is determined by judging whether the GP2 output from the G sensor 12 is more than a predetermined G (acceleration) value TH. If the judgment at step S20 is Yes (GP2>TH), then the routine goes to the following steps of starting a timer for counting over-time of the double time integration, which will be described later (step S30), setting the flag $F_{CAL}$ to "1" (step S40) and picking up the passenger's initial position $L_{DIST}$ from the passenger's position detecting device 3 and holding it (step S50).

At step S60, it is executed to check the over-time of the double time integration described later. Then, at this step S60, when the over-time exceeds a preset time T, the routine goes to step S70 to reset the flag $F_{CAL}$ into "0", sequent step S80 to clear a numerical value of the calculation timer and step S90 to clear the calculation value $L_{CAL}$ to "0".

Throughout the period from the start of vehicle's collision till the judgment to inflate the air bag, the double time integration is carried out by repeating the calculations in route of sequent steps S10, S60 and S100 for every calculation cycle ΔT. The calculation formula at step S100 is as follows:

$$L_{CAL}=L_{CAL}+GP1 \times \Delta T \times \Delta T$$

This calculating formula is provided for the double time integration of the outputs GP1 of the collision detecting G sensor 11, in digital. Thus, since the calculated value $L_{CAL}$ is brought by double integrating the deceleration GP1 due to the vehicle's collision, the same value $L_{CAL}$ corresponds to a displacement (moving distance) of the unrestrained passenger 33 when the vehicle abruptly stops to travel due to the vehicle's collision. Note, the initial value of $L_{CAL}$ is equal to zero.

Figure 4:
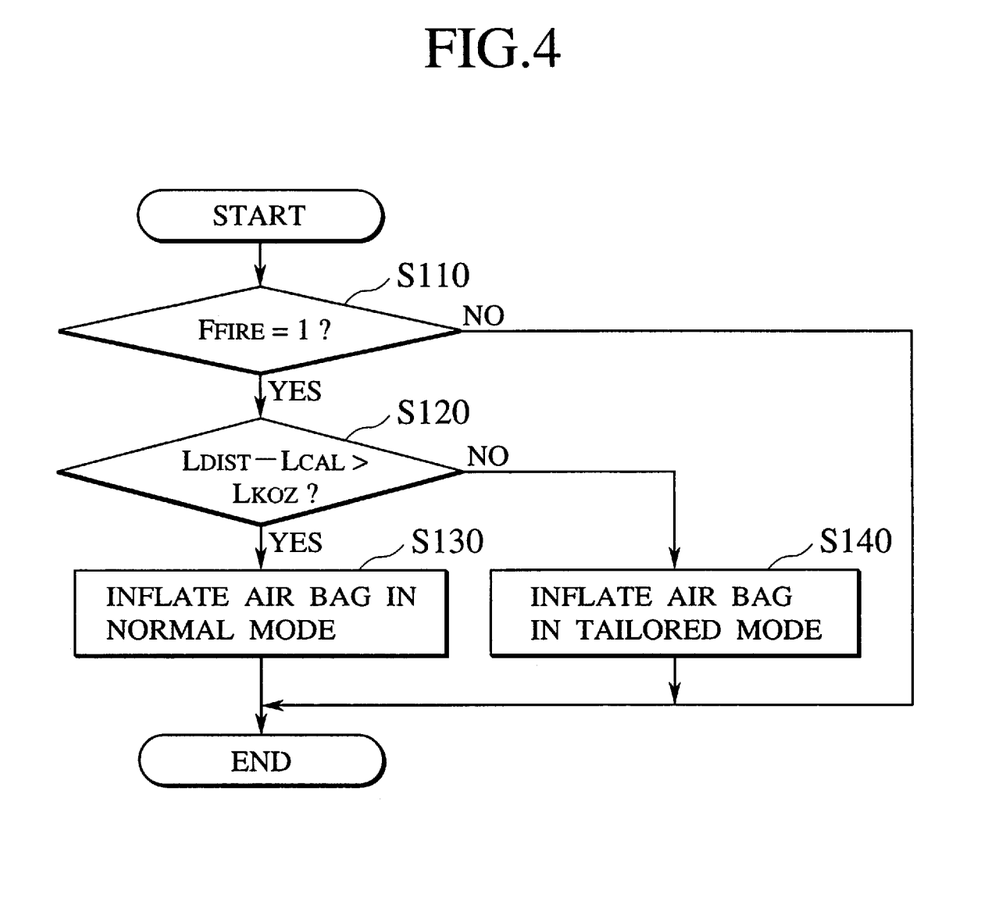
FIG. 4 is a flow chart showing a routine to select the air bag inflating mode in the first embodiment.

Both initial value $L_{DIST}$ obtained at step S50 and value $L_{CAL}$ calculated at step S100 are together employed in the inflating mode selecting routine shown in FIG. 4.

[Routine for selecting inflating mode for air bag]

When the unfolding of air bag is judged owing to the air bag inflating algorithm performed by the collision judging section 13, then an air bag inflating flag $F_{FIRE}$ is set to "1".

Now, in accordance with the routine of a flow chart shown in FIG. 4, it is judged at step S110 whether or not the inflating of air bag is being judged. If the judgment at step S110 is Yes ($F_{FIRE}$=1), then the routine goes to step S120. On the contrary, if the judgement at step S110 is No (i.e. $F_{FIRE}$=0), the routine is ended. p At step S120, it is judged where the passenger 33 does occupy at present, due to the pre-crush brake. That is, the passenger's position is judged by comparing a difference between the initial value $L_{DIST}$ obtained at step S50 and the value $L_{CAL}$ calculated at step S100 with the distance $L_{KOZ}$ defining the zone KOZ.

Then, if the passenger's position is out of the zone KOZ, then the routine goes to step S130 to output the command to inflate the air bag in the NORMAL mode. While, when it is judged that the passenger's position is within the zone KOZ, the routine goes to step S140 to output the command to inflate the air bag in the TAILORED mode.

Note that, when the vehicle's collision is so caused that it is judged of necessity of inflating the air bag, there is not carried out any process to detect the passenger's position the moment the necessity of inflating the air bag is determined and sequentially select the inflating mode of the air bag, in the passenger protecting apparatus of the first embodiment. Upon detecting the passenger's sitting position in advance, when the vehicle's collision occurs, it is executed to obtain the sitting position as the initial value by detecting the pre-crush brake performed just before the collision and further estimate the moving distance of the passenger due to the vehicle's negative acceleration produced after the pre-crush brake by the calculation. Then, according to the embodiment, the inflating mode for air bag is selected by judging whether the passenger exists in the zone KOZ at the time of judgment of the necessity of inflating the bag or the passenger exists in the zone SZ. Therefore, it is possible to appropriately select the air bag inflating mode even if the apparatus does not employ a sensor exhibiting high responsibility as means for detecting passenger's position.

Figure 5:
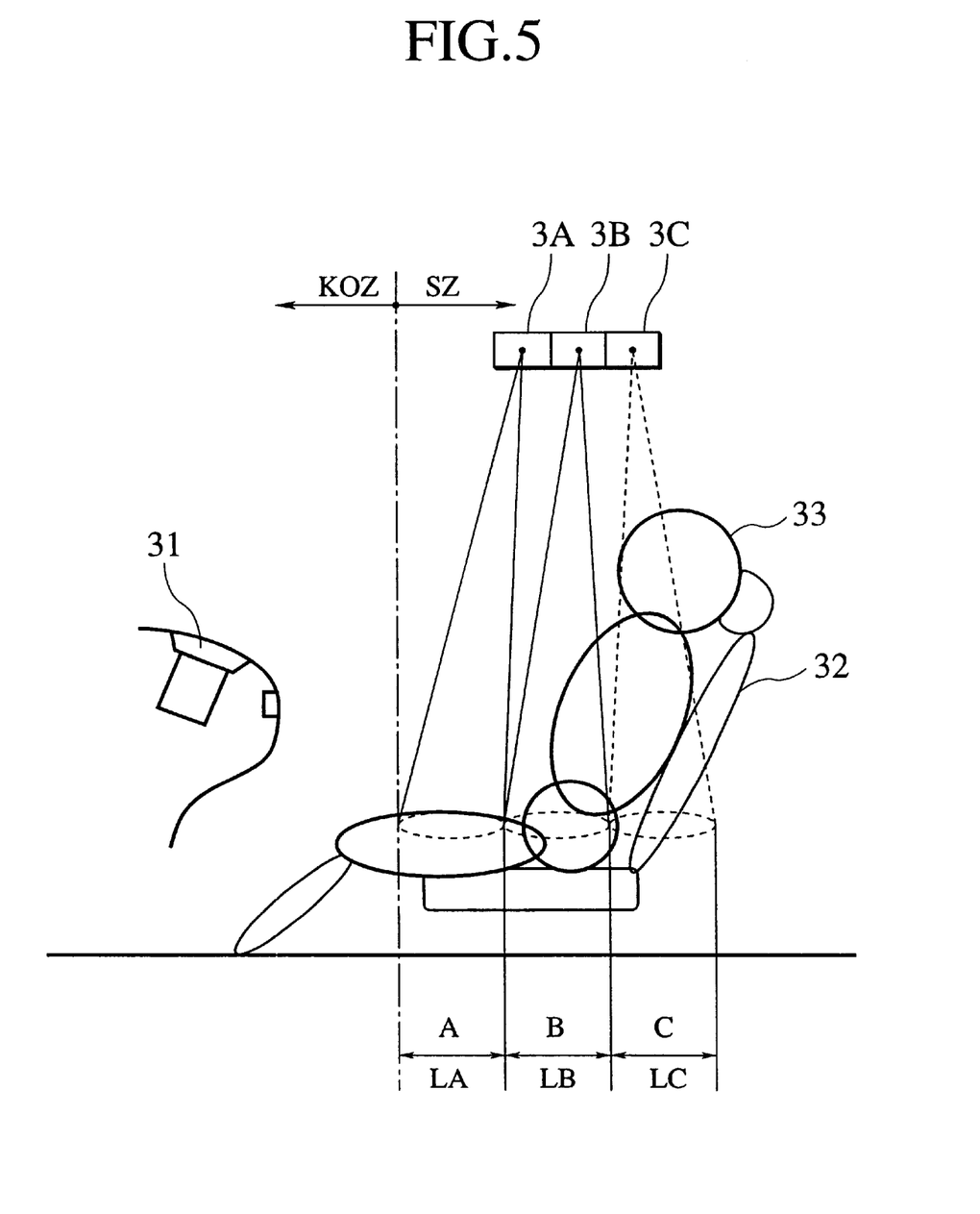
FIG. 5 is an explanatory diagram showing the constitution of a passenger position detecting device in accordance with a second embodiment of the present invention.

Next, the passenger protecting apparatus of the second embodiment will be described with reference to FIGS. 5 and 6. Although the above-mentioned apparatus of the first embodiment employs the passenger position detecting device 3 provided, in the vicinity of the deployment door, with the range finding sensor, a plurality of heat sensors 3A, 3B, 3C in the place of the range finding sensor are employed for detecting infrared light radiated from a head of the passenger 33 in the second embodiment, as shown in FIG. 5.

Besides, since each heat sensor for detecting the infrared light is not able to measure a distance, the passenger's sitting position that the passenger can occupy is divided into a plurality of zones (e.g. three zone A, B, C in FIG. 5), so that the respective sensor 3A, 3B, 3C do detect the infrared light irradiated from the head of the passenger in the zone A, B, C, respectively.

We now describe the operation of the apparatus in case of judging the inflating of air bag by the collision judging section 13 at the vehicle's collision. As similar to the first embodiment, at a point of time when the signal GP2 from the pre-crush brake detecting G sensor 12 exceeds the predetermined value TH before the above judgment, it is executed to start the double time integration for the signal GP1 from the collision detecting G sensor 11 by the passenger's displacement calculating section 14.

When the section 13 determines to inflate the air bag, the air bag inflating mode selecting section 15 picks up a zone signal representing the passenger's zone just before the collision from the passenger's position detecting device 3 and also inputs the calculation value $L_{CAL}$ from the passenger displacement calculating section 14 thereby to judge whether or not the position of the passenger 33 at the start of the inflation exists in the zone KOZ. That is, in the section 15, the following judgments are carried out:

(1) on condition that the passenger exists in the zone A;

$L_{CAL} \leq LA \rightarrow$ 2nd. mode (TAILORED Mode)

$L_{CAL} < LA \rightarrow$ 1st. mode (NORMAL Mode)

(2) on condition that the passenger exists in the zone B;

$L_{CAL} \leq LA+LB \rightarrow$ 2nd. mode (TAILORED Mode)

$L_{CAL} < LA+LB \rightarrow$ 1st. mode (NORMAL Mode)

(3) on condition that the passenger exists in the zone C;

$L_{CAL} \leq LA+LB+LC \rightarrow$ 2nd. mode (TAILORED Mode)

$L_{CAL} < LA+LB+LC \rightarrow$ 1st. mode (NORMAL Mode)]

On acceptance of the judgment in the air bag inflating mode selecting section 15, the drive circuit 16 allows the air bag 2 to unfold in the designated inflating mode.

Figure 6:
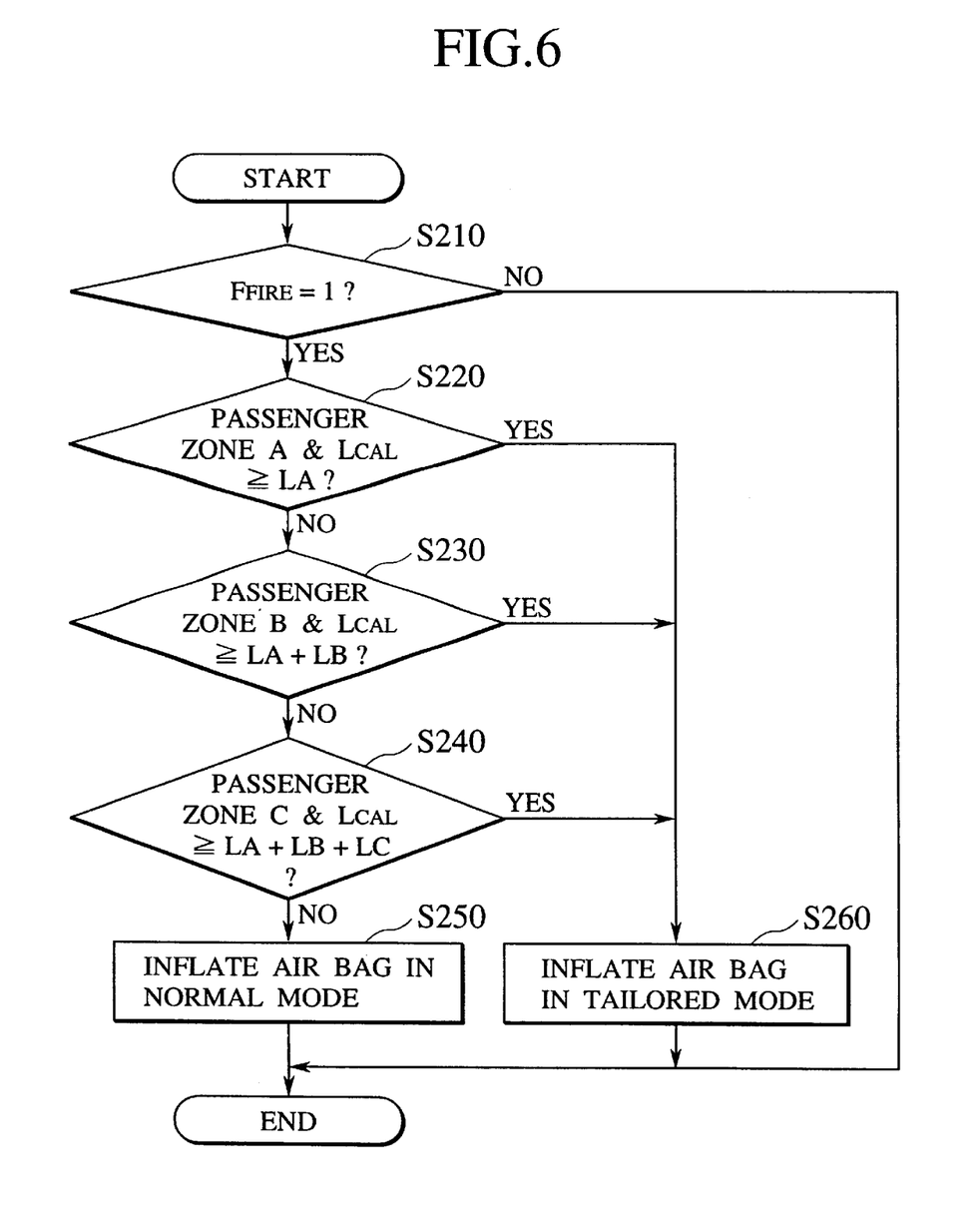
FIG. 6 is a flow chart showing a routine to select the air bag inflating mode in the second embodiment.

Based on a flow chart of FIG. 6, we now describe the routine to select the inflating mode in case of the adoption of the heat sensors 3A, 3B, 3C as the passenger's position detecting device 3, in detail. It should be noted that the routine for calculating the passenger's displacement after detecting the precrush brake is identical to the flow chart of FIG. 3 of the first embodiment. Besides, as the initial value of the passenger's position at step S50, it is executed to obtain the signal representing which of the zones A, B, C the passenger is now belonging to.

When the unfolding of air bag is judged owing to the air bag inflating algorithm performed by the collision judging section 13, then an air bag inflating flag $F_{FIRE}$ is set to "1".

Now, in the routine of the flow chart shown in FIG. 6, it is judged at step S210 whether or not the inflating of air bag is being judged. If the judgment at step S210 is Yes ($F_{FIRE}$=1), then the routine goes to step S220. On the contrary, if the judgement at step S110 is No (i.e. $F_{FIRE}$=0), the routine is ended.

At steps S220 to S240, it is judged where the passenger 33 does occupy at present, due to the pre-crush brake. When the passenger's position obtained at step S50 of FIG. 3 belongs to the zone A, then it is judged whether the latest moving distance $L_{CAL}$ calculated at step S100 exceeds a width LA of the zone A (i.e. $L_{CAL} \geq LA$).

Similarly, when the passenger's position obtained at step S50 of FIG. 3 belongs to the zone B, then it is judged whether the latest moving distance $L_{CAL}$ calculated at step S100 exceeds a total width LA+LB of the zones A and B (i.e. $L_{CAL} \geq LA+LB$). Further, when the passenger's position belongs to the zone C, then it is judged whether the latest moving distance $L_{CAL}$ exceeds a total width LA+LB+LC of the zones A, B and C (i.e. $L_{CAL} \geq LA+LB+LC$).

Then, if it is judged at each step S220, S230 or S240 that the passenger's position is out of the zone KOZ, then the routine goes to step S250 to output the command to inflate the air bag in the NORMAL mode. While, when it is judged that the passenger's position is within the zone KOZ, the routine goes to step S260 to output the command to inflate the air bag in the TAILORED mode.

Also in the second embodiment, it will be understood that when the vehicle's collision is so caused that it is judged of necessity of inflating the air bag, there is not carried out any process to detect the passenger's position the moment the necessity of inflating the air bag is determined and sequentially select the inflating mode of the air bag. Upon detecting the passenger's sitting position in advance, when the vehicle's collision occurs, it is executed to obtain the sitting position as the initial value by detecting the pre-crush brake performed just before the collision and further estimate the moving distance of the passenger due to the vehicle's negative acceleration produced after the pre-crush brake by the calculation. In this way, according to the second embodiment, the inflating mode for air bag is selected by judging whether the passenger exists in the zone KOZ at the time of judgment of the necessity of inflating the bag or the passenger exists in the zone SZ. Therefore, it is possible to appropriately select the air bag inflating mode even if the apparatus does not employ a sensor exhibiting high-speed responsibility as means for detecting passenger's position.

Although the invention has been described above by reference to two embodiments of the invention, the invention is not limited to the embodiments described above. Modifications and variations of the embodiment described above will occur to those skilled in the art, in light of the above teachings. For example, although the control of inflating mode is executed by controlling the ignition timing of the inflators in the above-mentioned embodiments, the apparatus may be equipped with inflators having different amounts of gas in the modification. In such a case, in the first mode, both of the inflators would be simultaneously ignited while igniting either one of the inflators in the second mode. Of course, the conventional inflators of various type are applicable to the present apparatus.

Additionally, although the supersensitive sensor is used for detecting the pre-crush brake in the above embodiments, the single collision detecting G sensor may be used as a sensor effecting both of the functions on condition that it is a supersensitive sensor capable of covering a wide range from the small acceleration to the large acceleration at the vehicle's collision.

Furthermore, making use of a sensor employed in the ABS (antilock braking system) apparatus, the operational signal of the sensor may be used for the above-mentioned start signal to calculate the passenger's displacement. More simply, the apparatus may be constructed so as to start the same calculation when a brake switch is activated.

Upon detecting whether the passenger is being fastened by a seat belt, the passenger protecting apparatus of the invention may be operated on condition that the passenger does not have the seat belt fitted thereon.

The entire contents of Japanese Patent Applications P10-187798 (filed Jul. 2, 1998) is incorporated herein by reference.

Although the passenger protecting apparatus in the shown embodiments is directed to the air bag in front of the front passenger's seat, the apparatus may be applied to any one of the air bags in the vicinity of the other passenger's seats, of course.

The scope of the invention is defined with reference to the following claims.

What is claimed is:

1. A passenger protecting apparatus for a vehicle, comprising:

an air bag capable of inflating in either a first inflating mode where the air bag is inflated under a first pressure or a second inflating mode where the air bag is inflated under a second pressure, the second pressure being established to be smaller than the first pressure;

a collision impact detecting unit for detecting a degree of impact produced at the vehicle's collision;

an abrupt brake detecting unit for detecting an abrupt braking of the vehicle;

a sitting position detecting unit for detecting the sitting position of a passenger;

an air bag inflation control unit for controlling the inflation of the air bag in either the first inflating mode or the second inflating mode; wherein when the abrupt brake detecting unit detects the abrupt braking, the air bag inflation control unit estimates the position of the passenger at the time of air bag's inflating on the basis of the detected sitting position and the degree of impact detected by the collision impact detecting unit; and wherein, when the degree of impact exceeds a predetermined value and the passenger's position estimated by the air bag inflation control unit is out of a designated zone defined by a predetermined distance from a deployment door, the air bag inflation control unit determines to inflate the air bag in the first inflating mode; and when the passenger's position estimated by the air bag inflation control unit is within the designated zone, the air bag inflation control unit determines to inflate the air bag in the second inflating mode.

2. The passenger protecting apparatus of claim 1, wherein the abrupt brake detecting unit comprises a sensor for detecting a braking deceleration produced due to the vehicle's abrupt brake.

3. The passenger protecting apparatus of claim 1, wherein the abrupt brake detecting unit comprises a brake switch which is to be activated when a driver steps on a brake.

4. The passenger protecting apparatus of claim 1, wherein the sitting position detecting unit comprises a range finding sensor for detecting a distance from a deployment door for the air bag to the passenger.

5. The passenger protecting apparatus of claim 4, wherein the air bag is provided in front of a front passenger's seat.

6. The passenger protecting apparatus of claim 1, wherein the sitting position is divided into a plurality of zones, and wherein the sitting position detecting unit comprises an infrared radiation sensor which senses infrared radiation from the head of the passenger when the passenger is sitting in each zone.

7. The passenger protecting apparatus of claim 6, wherein the air bag is provided in front of a front passenger's seat.

8. A passenger protecting apparatus for a vehicle, comprising:

an air bag capable of inflating in either a first inflating mode where the air bag is inflated under a first pressure or a second inflating mode where the air bag is inflated under a second pressure, the second pressure being established to be smaller than the first pressure;

collision impact detecting means for detecting a degree of impact produced at the vehicle's collision;

abrupt brake detecting means for detecting an abrupt braking of the vehicle;

sitting position detecting means for detecting the sitting position of a passenger;

air bag inflation control means for controlling the inflation of the air bag in either the first inflating mode or the second inflating mode; wherein when the abrupt brake detecting means detects the abrupt braking, the air bag inflation control means estimates the position of the passenger at the time of air bag's inflating on the basis of the detected sitting position and the degree of impact detected by the collision impact detecting means; and wherein, when the degree of impact exceeds a predetermined value and the passenger's position estimated by the air bag inflation control means is out of a designated zone defined by a predetermined distance from a deployment door, the air bag inflation control means determines to inflate the air bag in the first inflating mode; and when the passenger's position estimated by the air bag inflation control means is within the designated zone, the air bag inflation control unit determines to inflate the air bag in the second inflating mode.

* * * * *